Feb. 19, 1929.
V. B. TREVELLYAN ET AL
1,702,370
COLUMN FABRICATING MACHINE
Filed Dec. 21, 1925 7 Sheets-Sheet 1
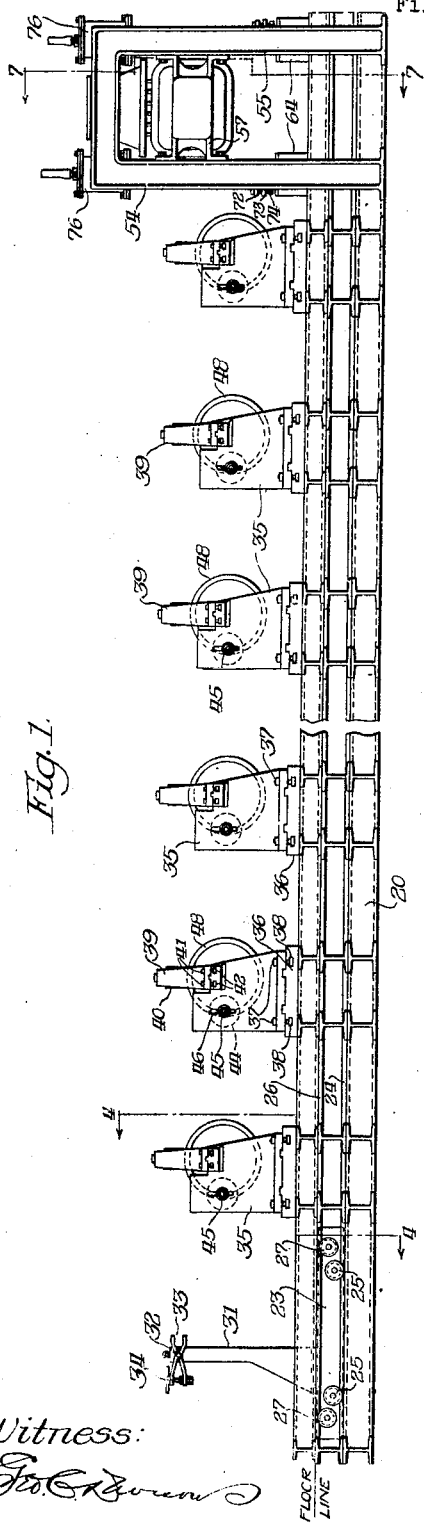
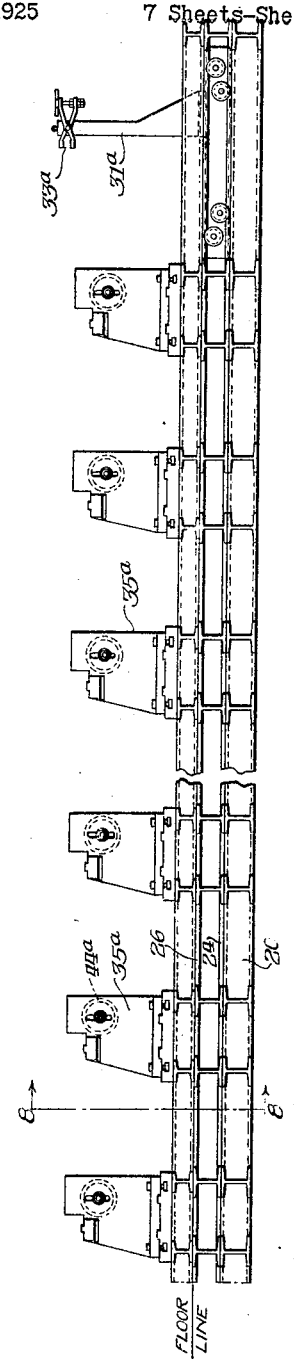
Witness:
Inventors:
Vernon B. Trevellyan
Wallace W. Smith
By Casper L. Redfield Atty

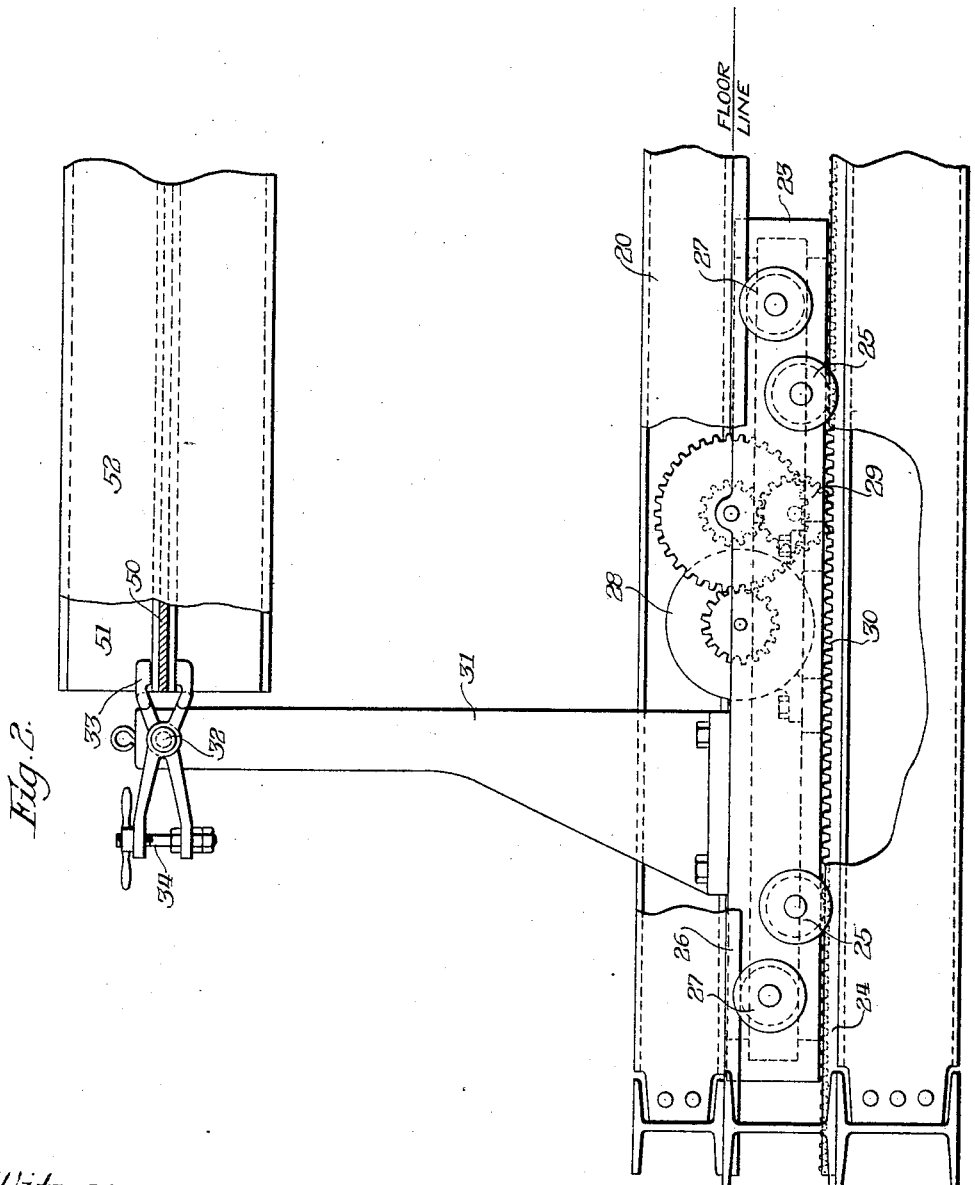

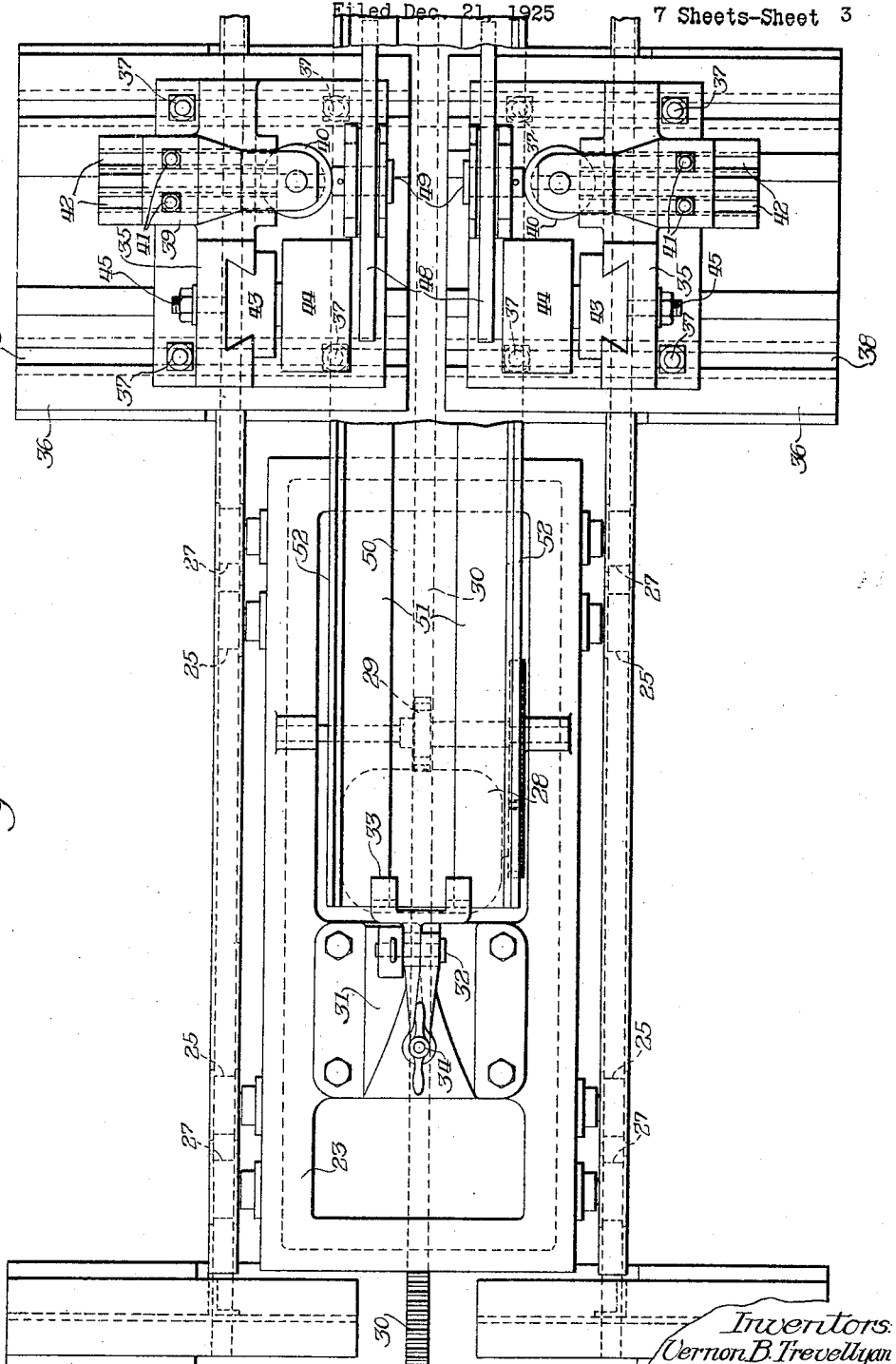

Feb. 19, 1929.  
V. B. TREVELLYAN ET AL  
1,702,370  
COLUMN FABRICATING MACHINE  
Filed Dec. 21, 1925  7 Sheets-Sheet 4
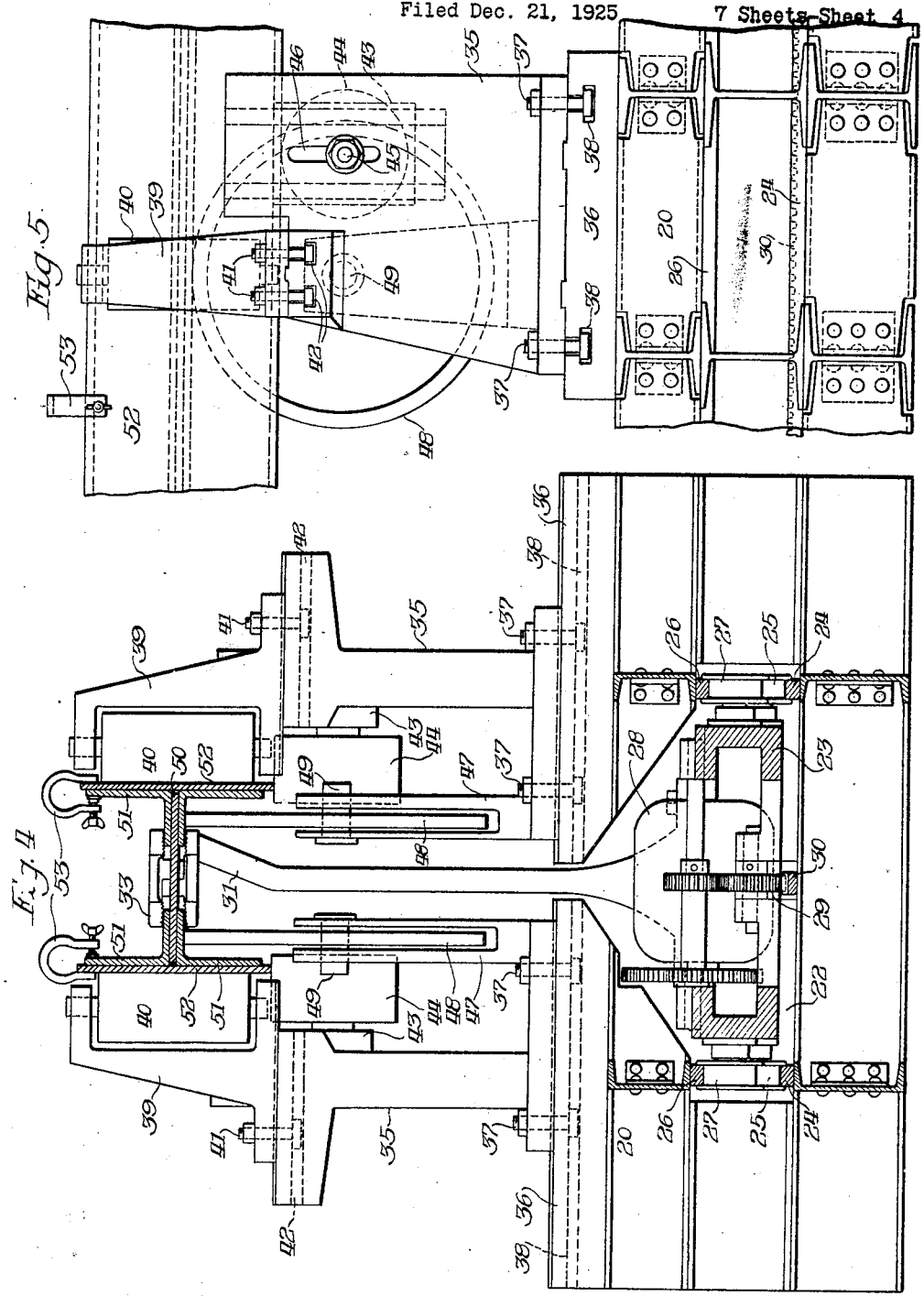

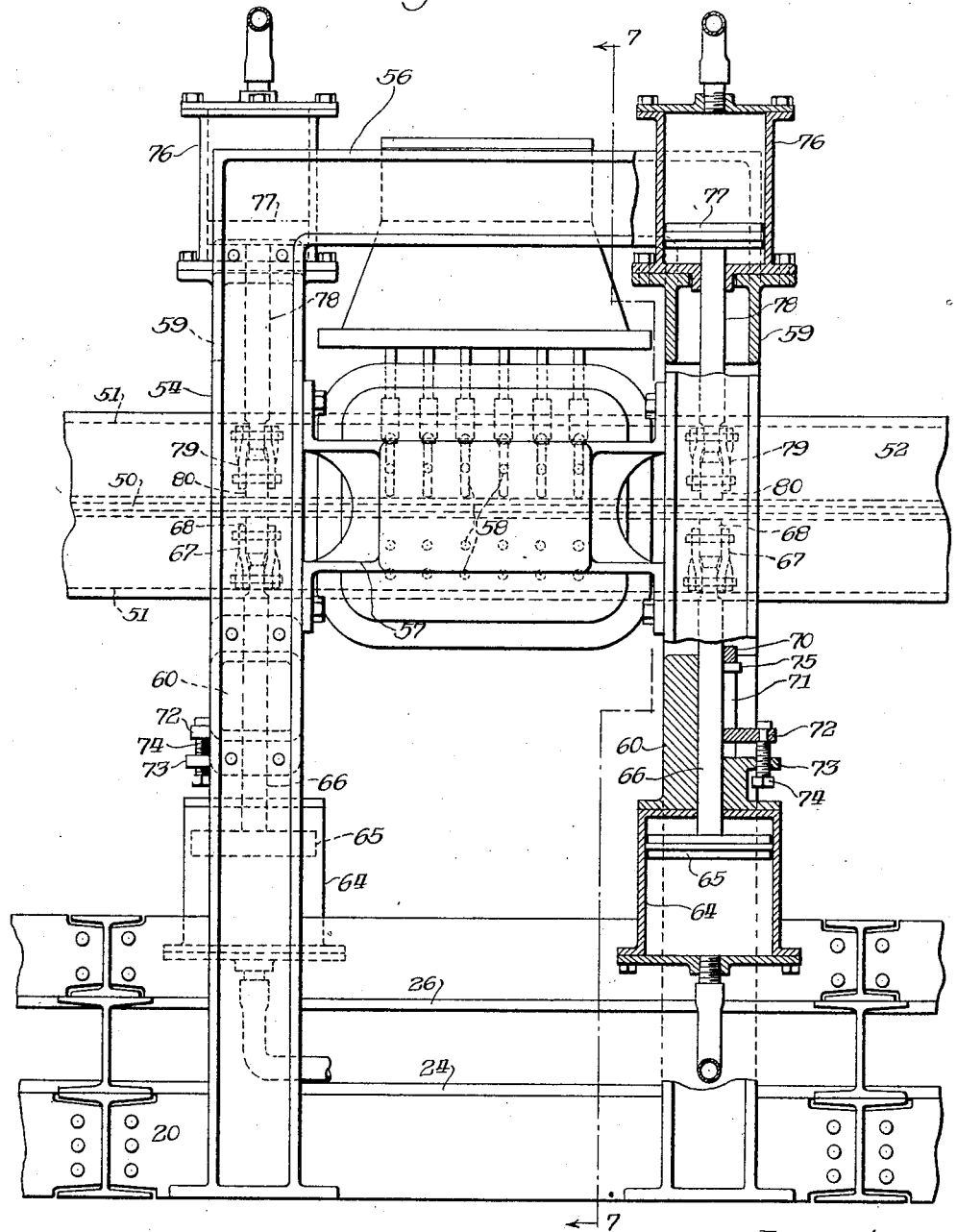

Feb. 19, 1929.
V. B. TREVELLYAN ET AL
1,702,370
COLUMN FABRICATING MACHINE
Filed Dec. 21, 1925   7 Sheets-Sheet 7
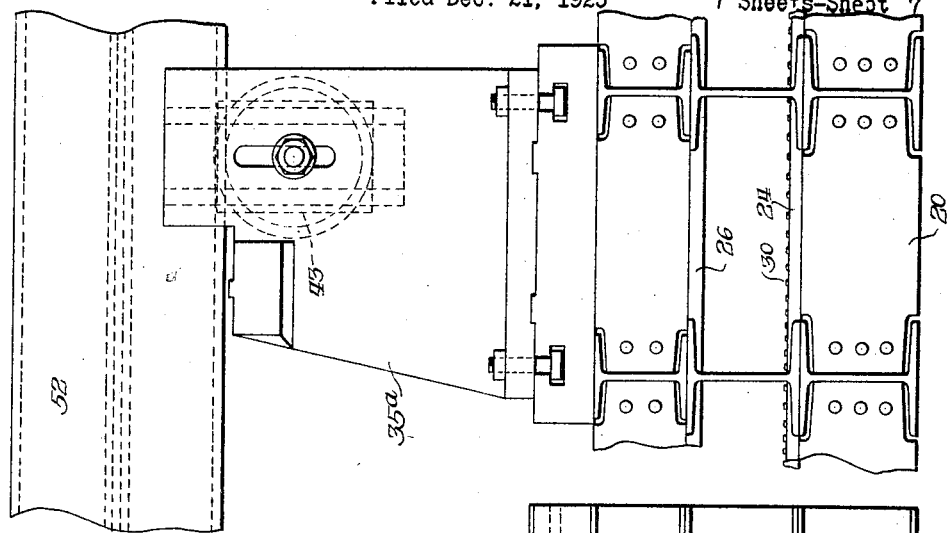
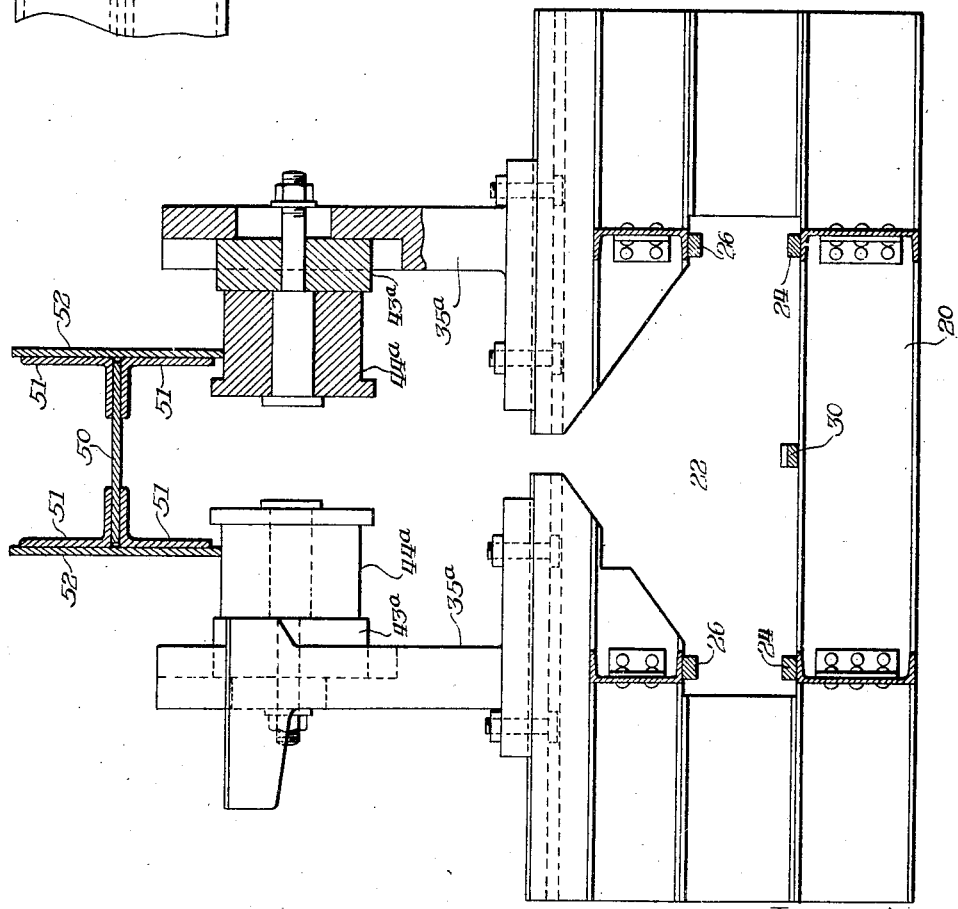

Patented Feb. 19, 1929.

1,702,370

UNITED STATES PATENT OFFICE.

VERNON B. TREVELLYAN AND WALLACE W. SMITH, OF CHICAGO, ILLINOIS, ASSIGNORS TO STRUCTURAL SERVICE CO., OF WILMINGTON, DELAWARE, A CORPORATION OF DELAWARE.

COLUMN-FABRICATING MACHINE.

Application filed December 21, 1925. Serial No. 76,884.

Our invention relates to column fabricating machines and has for its object the provision of improved means for producing columns and girders which are composed of plates and structural shapes secured together by rivets or by welding. A typical form of column consists of a central web plate, four angle irons, and two cover plates, assembled so that they form a column of H-shape in cross section, and that type of column is used to illustrate the operation of the machine.

Columns built up in this way and secured by rivets may have ten rivets at each horizontal level in an upright column, and these levels may be spaced vertically from two and one-half to six inches centers. Or the rivets may be staggered. A column twenty-five feet long would have four hundred or more rivets, and as each rivet goes thru two or more plates, a great number of holes must be made in the plates and angles which go to make up the column. At present it is a common practice to punch these holes in the plates and angles separately. While the spacing of these holes in the different pieces is fairly accurate, it is not so accurate but that it is necessary to ream out many of the holes before rivets can be inserted. This is hand work and consumes time. In the present machine we assemble the parts of the column, and drill and rivet them while they are held in assembled position.

In the accompanying drawings

Figs. 1 and 1ᵃ represent a side elevation of the machine which may have a total length of nearly one hundred feet for the fabrication of columns twenty-five feet in length. In these views, Fig. 1ᵃ is a continuation of Fig. 1 in which the left hand end of Fig. 1ᵃ connects to the right hand end of Fig. 1;

Fig. 2 is an elevation, at a larger scale, of the left hand end of Fig. 1, parts being broken away, and a part of the assembled column shown held in position;

Fig. 3 is a plan of Fig. 2 with some additional column-holding devices;

Fig. 4 is a section on line 4—4 of Fig. 1 and drawn to the scale of Figs. 2 and 3;

Fig. 5 is a side elevation of Fig. 4, this elevation being of the side opposite to that shown in Fig. 1;

Fig. 6 is an elevation, partly in section, of the drilling head shown at the right in Fig. 1;

Fig. 8 is a section on line 8—8 of Fig. 1ᵃ; and

Fig. 9 is a side elevation of Fig. 8.

Figure 7:
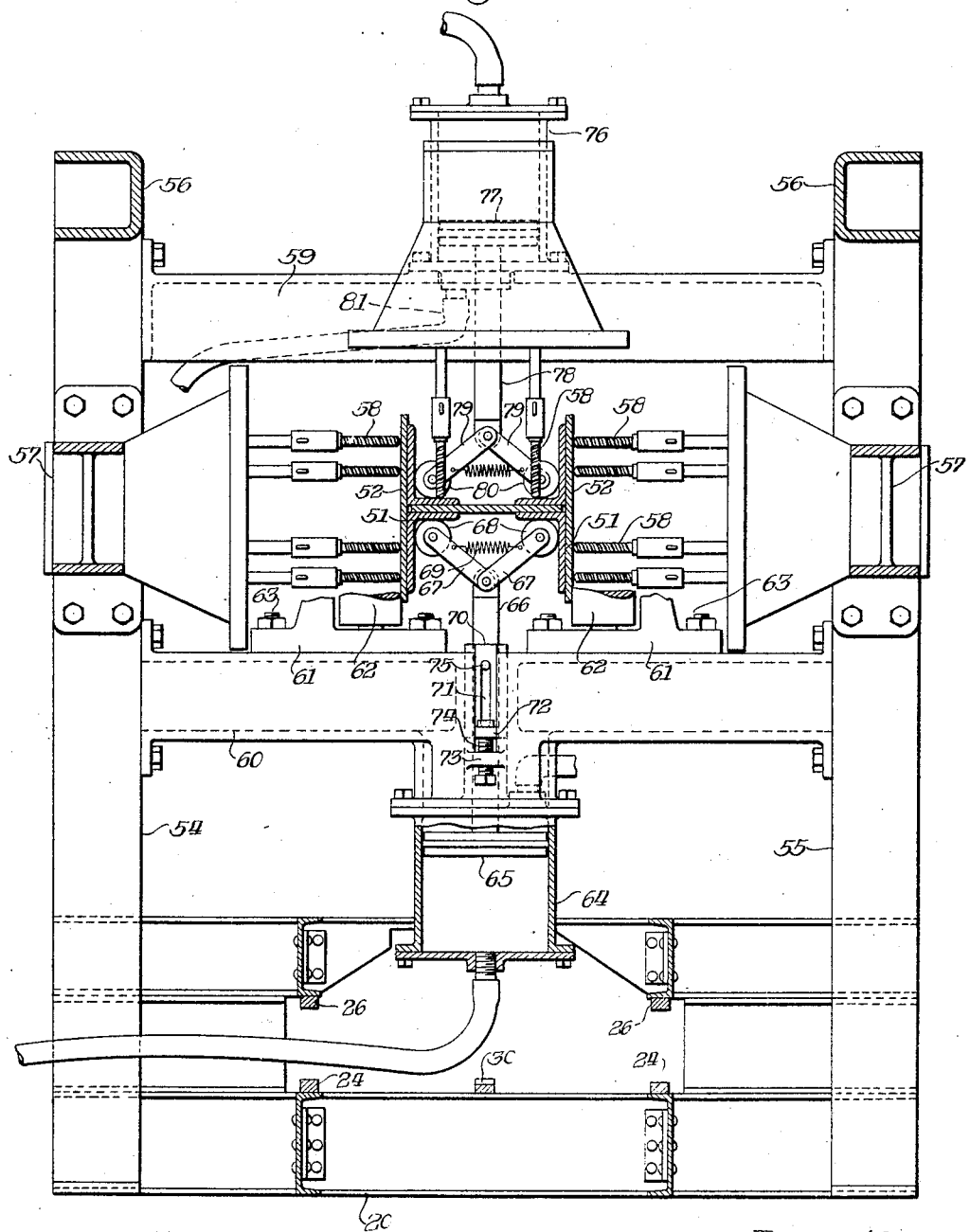
Fig. 7 is a section on lines 7—7 of Figs. 1 and 6.

The frame or bedplate 20 is conveniently made of structural shapes secured together, but may be of castings. Mounted on that part of the bedplate shown in Fig. 1 is a series of standards. These standards are column supporters, as will be described, and the distance, longitudinally on the machine, from center to center of supporters will depend upon the rigidity or flexibilty of the structural shapes used in forming the column. Ordinarily, a distance of four feet between centers of supporters will be appropriate.

About two-thirds of the frame or bedplate is located below the floor line of the building, as shown at the left in Figs. 1 and 1ᵃ, and at the right in Fig. 2. Inside of the bedplate is provided a longitudinal runway 22 for a carriage 23. (Figs. 2 and 4.) This runway extends thru that part of the bedplate shown in Fig. 1, but does not necessarily extend thru the drilling head shown at the right.

At each side of the runway 22 are rails 24 on which run wheels 25 suitably pivoted on the carriage 23. Above the rails 24 are other rails 26, and pivoted on the carriage are other wheels 27 which engage the lower faces of rails 26. As so arranged, the carriage 23 is a slide running on rollers. It may be withdrawn thru the open end of the runway at the left in Fig. 1, but otherwise it cannot be displaced from the rails by which it is guided.

Mounted upon the carriage 23 is an electric motor 28 which is connected thru a train of reducing gears to a pinion 29 which engages a rack 30 extending the length of the runway. It will be obvious that, by means of suitable electrical connections, an operator may start and stop the motor to cause the carriage to travel back and forth in the runway as may be desired.

Bolted or otherwise secured to the top of the carriage is a standard 31 having a pivoting pin 32 at its upper end. On pin 32 are mounted the clamping jaws 33 controlled by a hand screw 34. These clamping jaws are designed to grip one end of the column before the parts thereof have been drilled and riveted, and to hold those parts together during the drilling and riveting processes. The height of the jaws above the floor line determines the vertical location of the column while being formed, and the connection of the jaws to the carriage and to the column serves as a means of moving the column thru the machine.

Each of the supporting devices illustrated in Fig. 1 consists of two standards 35 mounted on plates 36 secured to the top of the bedplate 20. The standards 35 are secured in place by bolts 37, the heads of which are located in T-slots 38 in plates 36. These T-slots run transversely of the axis of the machine so that each standard 35 may be adjusted toward or from said axis.

On the top of each standard 35 is a bracket 39 which carries a roller 40 arranged to turn on a vertical axis. The brackets 39 are secured in place by bolts 41, the heads of which are located in T-slots 42 in the tops of the standards 35. The T-slots 42 are parallel with T-slots 38 so that rollers 40 may be adjusted toward or from the axis of the machine independently of the adjustment of the standards 35.

On the inner face of each standard 35 is a vertically adjustable slide 43 which carries a roller 44 mounted upon a horizontal pivot. The outer end of each pivoting pin for the rollers 44 forms a bolt 45 which extends thru slot 46 and serves as a means for securing the roller 44 at any desired vertical adjustment.

On the inner face of each standard 35, and preferably in front of the roller 40, is a bracket 47 which carries a roller 48 turning upon a horizontal pivot 49. The distance between each pair of rollers 48 is just enough to permit the jaws 33 to pass between them, as shown in Fig. 4, and the upper edges of the rollers 48 are a fraction of an inch below the center line of the column as it passes thru the machine. The rollers 48 are not necessarily adjustable as their sole purpose is to prevent the angle irons of the column from sagging materially before being riveted to the other plates.

The part of the machine so far described is that part in which the elements of the intended column are assembled. As illustrated in the drawings, these elements consist of a web plate 50, four angle irons 51, and two cover plates 52. Knowing the dimensions of the intended column, the rolls 40 of each pair of standards are adjusted to the proper distance from each other to give a space between them which will equal the width of the column as it appears in the drawings. This adjustment is by adjusting the standards 35, or by adjusting the brackets 39 on the standards, or by the combined adjustments of both.

Next, the slides 43 are adjusted vertically to bring the rollers 44 at proper position to support the cover plates 52.

With these adjustments made, the cover plates 52 are placed on the rollers 44 and held against the rollers 40 by hand during the remainder of the assembling process. The lower angle irons are then placed on the rollers 48, and the web plate placed on these. The upper angle irons are then placed on the web plate in the position shown. Hand clamps 53 may be used in holding the upper angle irons and cover plates in proper relationship, and these may remain during part of the subsequent operations. Having assembled the elements of the column by hand, the carriage 23 is then moved so that the clamping jaws 33 may grip the rear end of the column as shown in Figs. 2, 3 and 4.

The drilling head consists of apparatus carried by side frames 54 and 55 which are intermediate between the mechanism so far described, and that shown in Fig. 1ª. Each side frame has its legs connected above by a bridge 56, and below the legs are connected to a foundation, or to the bedplate 20. Between the upper and lower connections, each side frame has a bridge 57, and between the bridges 57 are supported drills 58 operating in gangs. As shown in Figs. 6 and 7, there are sixty of these drills operating to drill simultaneously six rows of holes in the elements of the column so that said elements may be secured together by rivets. As gang drills are common, and as gangs may be of any size, the only description here required is that of the means for presenting the material to be drilled in proper position to be drilled. And as it is common to secure metal bodies together by electric welding instead of by riveting, it will be evident that we might have illustrated welding devices instead of drills. The presentation and holding of the elements would be the same in either case.

The side frames 54 and 55 are connected together above by bridges 59 and lower down by bridges 60. On each of the bridges 60 are brackets 61 which carry rollers 62. These brackets and rollers correspond in all essentials to brackets 39 and rollers 40 before described. They are shown broken off in Fig. 7 to avoid obstructing the view of other parts. These brackets are adjustable longitudinally on their supporting bridges by bolts 63 having heads in T-slots in the bridges as previously described for bolts 41.

Secured to the lower face of each bridge 60, and at the center line of the machine, is an air cylinder 64 having a piston 65 and a piston rod 66. The rods 66 are guided in holes in the bridges, and extend above the same. On the upper end of each rod 66 are pivoted links 67 which have rollers 68 on their outer ends. A spring 69 connected to the links acts to draw the links and rollers toward each other from the position shown in Fig. 7.

In each bridge 60, and adjacent to the rod 66, is formed a guide, and in this guide is a slide 70 provided with a slot 71. On the lower end of the slide 70 is a lug 72, and on the bridge 60 below the slide 70 is a lug 73. A screw 74 secured to lug 72 and threaded in lug 73 serves as a means for giving the slide 70 a vertical adjustment. A pin 75 secured to the rod 66 and operating in the slot 71 serves as a means for limiting the upward movement of the piston 65 and the parts secured thereto. It will be evident that an adjustment of the screw 74 will serve to adjust the upward limit of the movement of the piston 65.

Secured on the upper faces of the bridges 59 are air cylinders 76 provided with pistons 77 and rods 78 which extend downward. On the lower ends of rods 78 are links 79 and rollers 80 which correspond to the links and rollers previously described. There are, however, for the upper cylinders 76, no adjusting devices corresponding to the screws 74 for the lower cylinders 64. Also, the upper cylinders 76 are materially less in diameter than are the lower cylinders 64. As a consequence, when compressed air from a common source is admitted simultaneously to cylinders 64 and 76, the force pressing upward will be materially greater than the force pressing downward.

That part of the bedplate shown in Fig. 1a is the same in construction as the part shown in Fig. 1, but may be considerably less in length. It has the runway 22, the lower and upper rails 24 and 26, and the rack 30. And in this runway is a carriage like that before described, and a standard 31a and clamping jaws 33a.

On this part of the bedplate are standards 35a having adjustable slides 43a which carry rollers 44a. These standards do not have brackets 39 and 47 with their rollers 40 and 48 as they are not needed here. Otherwise, these parts correspond to the parts 35, 43 and 44 previously described.

In operating the machine, operators are employed in the assembling process as previously described. Another operator is located at the drilling head and controls the operations of the drills, and also the operations of the carriages located in the two ends of the machine. At the right of the drilling head, and adjacent to the left hand part of the machine shown in Fig. 1a, are operators involved in the riveting process. The riveting may be by hand or by any one of a number of riveting machines now in common use. As the riveting process is not any part of the present invention, the drawings are confined to providing space in which it may occur, and the description is confined to stating when and where it occurs.

After the assembling operators have assembled the elements of a column as before described, the operator at the drilling head starts the motor 28 to move carriage 23 so as to bring the clamping jaws 33 to position on the ends of parts assembled. After that is done, one of the assembling operators tightens screw 34 so as to close jaws 33 on the end of the column, which end will hereafter be called the rear end. When the column is so clamped, the operator at the drilling head again starts the motor to move the assembled column forward toward the drilling head. While being so moved, the cover plates 52 are confined between the edges of the web plate 50 and the rollers 40. As the plates 50 and 52 are long, and as the rollers 40 are located at short distances from each other, there is no chance for material displacement in a lateral direction. At the same time, the plates 52 are supported vertically by rollers 44, and the lower angle irons are supported by rollers 48. While there is a certain amount of looseness between the various elements of the column as it is being moved forward in the machine, these elements are retained close to the relative positions which they are to have when riveted.

When the column has been advanced so that its forward end comes under two or three rows of drills, the motor is stopped with the forward end of the column the desired distance from the nearest row of holes. At the time when the column is advanced as just described, the pistons 65 are at the lower ends of cylinders 64, and pistons 77 are at the upper ends of cylinders 76. The pistons 65 may be retracted by gravity, or by the admission of compressed air above them at the same time that air below them is exhausted. Similarly, pistons 77 may be retracted by elevating springs, or by compressed air admitted to the cylinders below them. A pipe for such admission is shown at 81 in Fig. 7. As admission and exhaust of compressed air is by manual operations of the operator, the only parts here shown are the connections for alternate admission and exhaust.

When the pistons 65 and 77 are retracted, the rollers 68 for the lower piston and rollers 80 for the upper piston are drawn toward each other by the adjacent springs, but only to an extent which will leave the supporting links spread out at an angle similar to, but less than, that shown in Fig. 7.

When the forward movement of the column has been arrested at the desired position, as before indicated, the operator admits air to the cylinders 64 and 76 behind the pistons therein. At this stage of the proceedings, the compressed air is admitted only to those cylinders which are shown at the left in Figs. 1 and 6 because the forward end of the column has not yet come adjacent to parts operated by the other two cylinders. The rise of the piston 65 as a consequence of admitting compressed air behind it causes the rollers 68 to impinge on the lower faces of the horizontal flanges of the lower angle irons 51. The continued rise of the piston 65 causes the rollers 68 to travel outward into contact with the vertical faces of these angle irons and force them outward until the cover plates are pressed against the upright guiding rollers 62 which are directly behind the points at which the rollers 68 impinge. These upright rollers thus form abutments which resist the outward strain produced by the piston rise. The upward movement of the piston 65, and the actions consequent thereon, are arrested by the pin 75 engaging the upper end of the slot 71 in adjustable slide 70.

At the time while the above operations are occurring, air is also entering cylinder 76 and piston 77 is descending. As a consequence, rollers 80 first strike the upper horizontal faces of the upper angle irons, and then travel outward forcing these angle irons against plates 52 and these plates against the rollers 62 behind them. If the lower piston has come to rest by reason of pin 75 engaging the upper end of slot 71 before the upper piston has completed its stroke, then the downward movement of the upper piston is arrested by the fixed elevation of the plates and angle irons. If the upper piston descends more rapidly than the lower one ascends, then the web plate and angle irons will be temporarily deflected downward. This temporary deflection, however, will be corrected by the rise of the lower piston, and the lower cylinder is powerful enough not only to raise the column elements but to push back the upper piston. As a consequence, the vertical position of the column is determined by the position of the adjustable slide 70.

It is to be observed that the web plate is clamped between the angle irons by a force which is equal to the downward pressure exerted in the cylinder 76, and this may be anything desired. It is also to be observed that the links 67 form a toggle joint operated by the lower cylinder and the links 79 form another toggle joint operated by the upper cylinder. As a consequence, the angle irons and cover plates are clamped between rollers 68 and 80 on one side and rollers 62 on the other. While the elements of the column are thus clamped together by heavy pressures, the operator starts the drills which form the first rows or sets of holes.

When the holes have been drilled and the drills withdrawn, the operator releases the pressures exerted by the cylinders by causing the pistons therein to be retracted. As soon as such release is effected, he starts the motor 28 to advance the column until the forward end projects thru the drilling head to the right. He then admits compressed air to all four cylinders to clamp the column at both sides of the drilling head, and as soon as such clamping has occurred he starts all drills into operation.

While the drills are thus operating, rivets are placed in the holes in the projecting forward end and secured either by hand or riveting machine. As soon as this riveting is completed there is no longer any possibility of the elements of the column being longitudinally displaced with respect to each other, and the clamps 53 (Figs. 4 and 5) may be removed.

As soon as rivets have been placed in the first holes drilled, and the drills have been withdrawn from the second series of holes (the first complete series of holes) the clamping devices are again retracted and the motor 28 again started to move the column to proper position for drilling the next series of holes. The operator then operates the clamping devices and drills as before, and riveting is going on in the previously drilled holes while the new holes are being drilled.

Also, as soon as the column is clamped for the last mentioned operation, the clamping jaws 33 are released from the rear end of the column and the carriage 23 is returned to initial position at the left end of Fig. 1. At the same time the corresponding carriage at the right end of Fig. 1$^a$ is brought up, and the jaws 33$^a$ are clamped upon the forward end of the column. From this time on, the carriage at the right pulls the column along step by step for the successive drilling and riveting operations until those operations are completed and the finished column lies in that part of the machine shown in Fig. 1$^a$. It may then be removed by crane or by hand. It is to be understood that the two carriages are alike, and are controlled by the operator located at the drilling head.

As soon as the carriage 23 is returned to the left of Fig. 1, the workmen at that place begin assembling the parts for a new column, and they carry on this assembling operation while the previous column is being drilled and riveted. Because a large portion of a column being drilled lies in the part of the machine shown in Fig. 1 while a new column is being assembled, this part of the machine needs to have a length equal to about twice the length of a column. Because a column may be removed as soon as the riveting is completed, or as soon as its rear end is clear of the drilling head frame, the part of the machine shown in Fig. 1$^a$ needs to have a length only a little greater than the length of the longest column to be fabricated.

It is to be observed that the machine has a central axis represented by an imaginary line extending between the center of the jaws 33 and the center of the jaws 33$^a$, and that the operating parts are adjustable with respect to this axis. This axis is the axis about which the columns are constructed. The standards 35 are located on opposite sides of this axis, and are adjustable toward and from it. On the standards 35 are rollers 44 which are vertically adjustable to support the elements of the column at a proper elevation while being assembled, and also on the standards are rollers 40 which are transversely adjustable to bring the elements to a proper lateral position. Taken together, the rollers 40, 44 and 48 form a channel within which the elements of the prospective column are assembled by hand. It is a channel which is adjustable both as to depth and width. As the bottom and sides of this channel are composed of rollers, it is one within which the assembled parts may be moved easily from the position at which they are assembled to the position at which they are drilled and riveted.

At the drilling head, the drills 58 are arranged about this axis, and the clamping devices operated by the air cylinders are controlled by adjustable devices so that the column has its axis held definitely at the axis of the machine.

What we claim is:

1. In a machine of the class described, a bedplate having a central axis, standards located on opposite sides of the bedplate and adjustable laterally with respect to said axis, column-supporting rolls carried by said standards and vertically adjustable with respect thereto, column-guiding rolls also carried by said standards, and power mechanism arranged to move a column supported and guided by said rolls.

2. In a column fabricating machine, rollers for supporting the elements of a column before said elements are secured together to form a column, means for adjusting said rollers vertically so that the elements will be supported at a proper elevation, other rollers for guiding said elements, means for giving lateral adjustment to the last mentioned rollers, a carriage, clamping jaws carried by the carriage and serving to grasp the column elements, and means for operating the carriage to move the elements supported and guided by said rollers.

3. In a column fabricating machine having a bedplate, element assembling devices comprising supporting and guiding rollers for supporting and guiding the elements of a column before said elements are secured together, said bedplate having a runway below of said devices, a carriage mounted in said runway, clamping jaws carried by said carriage and arranged to grasp assembled elements, and means for moving said carriage in said runway so as to convey the assembled elements to a position at which they may be secured together.

4. In a column fabricating machine, element assembling devices comprising rollers for supporting and guiding the elements of a column before said elements are secured together, means for adjusting said rollers so that elements will be held at a predetermined relationship to the axis of the machine, clamping jaws for grasping the assembled elements, and means for moving said jaws so as to carry the assembled elements from the position at which they were assembled to a position at which they may be secured together.

5. In a machine of the class described, adjustable rollers serving to support and other adjustable rollers serving to guide the elements of a column while said elements are being assembled and while the assembled elements are being moved from the place of assembly to another place, a power device for so moving the assembled elements, and a temporary clamping device for holding the elements from relative displacement during such movement.

6. In a machine of the class described, a bedplate, standards supported by the bedplate, horizontal and vertical rollers carried by and adjustable on said standards, the rollers on the several standards serving to form a channel within which the elements of a column may be assembled, and power devices for moving the assembled elements from that part of the channel within which they were assembled to another part at which they may be secured together permanently.

7. In a column fabricating machine, a series of rollers forming a channel within which the elements of a column may be assembled by hand, means for adjusting the rollers to vary the width and depth of the channel so as to adapt it to columns of different sizes and shapes, and power devices for moving the assembled elements from the part of the channel within which they were assembled to another part.

8. In a column fabricating machine, a series of rollers forming a channel within a part of which the elements of a channel may be assembled, element clamping devices located in another part of the channel, means for shifting the assembled elements from the place of assembly to the clamping devices, and devices for drilling the assembled when clamped together.

9. In a column fabricating machine, devices forming a channel within which the elements of a column may be assembled, element clamping devices, means for moving the assembled elements to the clamping devices, means for operating the clamping devices so as to hold the elements firmly in the desired relationship to each other, and means for forming rivet holes in the elements when so clamped.

10. In a column fabricating machine providing a channel within which the elements of a column may be assembled, clamping and positioning devices, means for moving the assembled elements longitudinally in the channel to the clamping and positioning devices, means for operating the clamping and positioning devices, and means for forming rivet holes in the elements when so held.

11. In a machine providing means for assembling the elements of a column to be fabricated, power operated clamping devices arranged to automatically bring the assembled elements to proper position with respect to each other and to hold them firmly at such position, and means for forming rivet holes in the elements when so held.

12. In a machine providing a channel for the assembling of the elements of a column to be fabricated, power operated clamping devices arranged to automatically bring the assembled elements to proper position with respect to each other and to hold them firmly at such position, means for moving the assembled elements longitudinally in the channel to present them to the clamping devices, and means for forming rivet holes in the elements when held by the clamping devices.

13. In a machine providing a channel in one part of which the elements of a column may be assembled and in another part of which the assembled elements may be riveted together, clamping and drilling devices located between the two parts of said channel, and power devices for moving the assembled elements step by step thru the clamping and drilling devices from the first part of the channel to the second part.

14. In a machine providing a channel within which the elements of a column may be assembled, devices for forming rivet holes in the assembled elements, power operated clamping devices located in the line of the channel and on opposite sides of the hole forming devices, and means for moving the assembled elements in the channel to present them step by step to the clamping and hole forming devices.

15. In a machine of the class described, a drilling head provided with a gang of drills, means for presenting loosely assembled elements of a column to the drills, and power operated clamping devices arranged to automatically bring the loosely assembled elements to a desired relationship to each other and to hold them firmly at such relationship while they are being drilled by said drills.

16. In a machine provided with means for supporting and holding the loosely assembled elements of a column, power devices arranged to engage the loosely assembled elements on opposite sides and move them automatically to the desired fixed relationship to each other and to hold them firmly at such relationship, and means for forming rivet holes in the assembled elements while being so held.

17. In a machine provided with means for supporting and holding loosely assembled elements of a column, abutments located on opposite sides of the group of assembled elements, and power operated devices arranged to grip the upper and lower faces of said elements and to automatically force the laterally movable elements against said abutments.

18. In a machine provided with means for supporting the loosely assembled elements of a column, abutments located on opposite sides of the group of assembled elements, toggle joints located above and below the assembled elements and between certain ones of them, and power devices connected to the centers of said toggle joints.

19. In a machine provided with means for supporting a group of loosely assembled elements of a column, abutments below and on the two sides of the group, a toggle joint having rollers on the outer ends of the links of the toggle and located above and between certain elements of the group, and connections at the center of the toggle for applying pressure to clamp the elements between the rollers and the abutments.

20. In a machine provided with means for supporting a group of loosely assembled elements of a column, abutments on the two sides of the group, a power device provided with a toggle arranged to lift the elements of the group and clamp certain ones of them against said abutments, a stop for limiting such lifting action, and a second power device of less capacity and provided with a second toggle acting similarly on said elements by pressing downward.

21. In a machine provided with means for supporting column elements loosely assembled in positions approximating the positions in which they are to be when riveted together, power devices arranged to move the assembled elements to and clamp them in their final relative positions, and means for forming rivet holes in said elements while so clamped.

22. In a machine of the class described, a bed plate having a central axis, standards located on opposite sides of the bed plate and adjustable laterally with respect to said axis, column-supporting rolls carried by said standards and vertically adjustable with respect thereto, and column guiding rolls also carried by said standards.

23. In a column fabricating machine, rollers for supporting the elements of a column before said elements are secured together to form a column, means for adjusting said rollers vertically so that the elements will be supported at a proper elevation, other rollers for guiding said elements, means for laterally adjusting said last-named rollers, and means for advancing the elements supported and guided by said rollers.

24. In a column fabricating machine having a bed plate, element assembling devices comprising supporting and guiding rollers for supporting and guiding the elements of a column before said elements are secured together, said bed plate having a runway below the plane of said devices, and a carriage mounted in said runway and engaging said elements and serving to move said elements in their assembled condition.

25. In a column fabricating machine, element assembling devices comprising rollers for supporting and guiding the elements of a column before said elements are secured together, means for adjusting certain of said rollers so that said elements will be held at a predetermined relationship to the axis of the machine, clamping jaws for grasping the assembled elements, and means for moving said jaws so as to carry the assembled elements from the position at which they were assembled to a position at which they may be secured together.

26. In a machine of the class described, a bed plate, standards supported by the bed plate, and horizontal and vertical rollers carried by and adjustable on, said standards, the rollers on the several standards serving to form a channel within which the elements of a column may be assembled and in which the assembled elements are movable.

27. In a machine of the class described, a base-member, standards supported on the base-member, and horizontal and vertical rollers carried by and adjustable on said standards, the rollers on the several standards serving to form an open-sided channel in which the elements of a column may be assembled and in which the assembled elements may be moved from that part of the channel within which they are assembled to another part of the channel at which work is performed thereon.

28. In a machine of the class described, a drilling head provided with a gang of drills, means for presenting loosely assembled elements of a column to the drills, and clamping devices operative to move the loosely assembled elements into a desired relationship to each other and to hold them firmly in such relationship while they are being drilled by said drills.

29. In a machine provided with means for assembling and holding the loosely assembled elements of a column, devices arranged to engage the loosely assembled elements at opposite sides thereof and operative to move them to the desired fixed relationship to each other and to hold them firmly in such relationship, and means for forming rivet holes in the assembled elements while so held.

30. In a machine provided with means for holding loosely assembled elements of a column, abutments between which is supported a group of assembled elements, and devices arranged to engage said elements and operative to force the laterally movable ones of said elements against said abutments.

31. In a machine of the character described, the combination of means for supporting for movement longitudinally, elements to be united to form a fabricated object, means located at two points in the path of such longitudinal movement for clamping said elements to be secured together to form a fabricated object, and means located between said clamping means for operating on said elements while so clamped.

32. In a machine of the character set forth, the combination of work-supporting means comprising laterally spaced supporting devices along which the work is movable, a work-feeding carriage for movement along the machine, and a support for said carriage located below the plane of said devices, said carriage having a portion extending upwardly in the space between said devices and at which portion the carriage operatively engages with the work.

33. In a machine of the character set forth, the combination of a frame, opposed clamping means on said frame for clamping the work at opposite sides thereof, and drilling mechanism so arranged that the force exerted thereby is resisted by said clamping means operating as abutments.

34. In a machine of the character set forth, the combination of a frame, opposed movable clamping means on said frame for clamping the work at opposite sides thereof, and drilling mechanism on said frame and so arranged that the force exerted thereby is resisted by said movable clamping means operating as abutments.

35. In a machine of the character set forth, adjustable abutments between which roughly assembled elements are moved, clamping devices arranged to move such elements transversely to a predetermined relationship to the axis of the machine and to clamp laterally movable elements against said abutments, and means for forming rivet holes extending thru a plurality of such elements while so clamped.

36. In a machine for the fabrication of articles composed of angles and plates, supporting devices within which such elements are roughly assembled, abutments between which such assembled elements are moved, clamping devices movable toward each other to center said elements at the axis of the machine and to clamp laterally movable elements against said abutments, and means for forming rivet holes each extending thru a plurality of elements while so clamped.

37. In a machine of the character set forth, the combination of a frame, upper and lower movable clamps at opposite sides of the work, and vertical drilling mechanism on said frame so arranged that the vertical force exerted thereby is resisted by the lower one of said clamps.

38. In a machine of the character set forth, the combination of a frame, upper and lower clamps at opposite sides of the work, laterally placed abutments against which the sides of the work is forced by said clamps, and horizontal drilling mechanism operating against a side of the work and so arranged that the horizontal force exerted thereby is opposed by one of said abutments.

39. In a machine of the character set forth, the combination of a plurality of movable means for clamping the work at spaced apart points along the work, and drilling mechanism located between the points at which the work is clamped, said clamping means operating to resist the force exerted by said drilling mechanism.

40. In a machine of the character set forth, the combination of a plurality of movable means for clamping the work at spaced apart points along the work, and drilling mechanism located between the points at which the work is clamped and adapted to operate on different sides of the work, certain parts of said clamping means serving to resist the force exerted by said drilling mechanism.

41. In a machine of the character set forth, the combination of a plurality of means for clamping the work at spaced apart points along the work, and drilling mechanism arranged to drill the work in three different directions and located between the points at which the work is clamped, said clamping means operating to resist the force exerted by said drilling mechanisms.

42. In a machine of the character set forth, a series of rollers arranged to form an open-sided channel serving as a receptacle for the loose assembly of a group of metallic plates and angles, said rollers serving also as a guide for the longitudinal movement of the group after it has been assembled.

43. In a machine of the character set forth, rollers grouped to support the depending side portions of column forming elements, to oppose the outer faces of the side elements thereof and to engage the underside of portions of said elements between the depending side portions thereof and thereby form a channel in which said elements are movable lengthwise to a position to be operated on.

44. In a machine of the character set forth, work supporting and guiding rollers comprising vertical rollers spaced apart, and horizontal rollers adjacent thereto, certain of said horizontal rollers being located in a plane above the other of said horizontal rollers, thereby to form an open-sided channel to receive column forming elements.

45. In a machine of the character set forth, the combination of means for supporting for movement longitudinally and with portions thereof flatwise opposed elements to be secured together to form a fabricated object, means for drilling continuous holes through a plurality of flatwise opposed portions of said elements, and means adjacent said drilling means operative to effect the positioning of said elements at a predetermined elevation relative to said drilling means.

46. In the manufacture of fabricated objects comprising plate and structural-shape elements, the improvement which consists in manually assembling the various elements into the approximate relative positions they occupy in the finished object, advancing the assembled elements and intermittently forcing the elements from the approximate positions into the final position they are to occupy in the completed object.

47. In the manufacture of fabricated objects composed of plate and structural-shape elements, the improvement which consists in assembling the various elements into the approximate relative positions they are to occupy in the finished object, advancing the assembled elements and intermittently forcing the elements from the approximate positions into the final position they are to occupy in the completed object and in such position forming apertures in said elements.

48. In the manufacture of fabricated objects composed of plate and structural-shape elements, the improvement which consists in assembling the various elements into the approximate relative positions they are to occupy in the finished object, advancing the assembled elements and intermittently forcing the elements at spaced apart points along said elements from the approximate positions into the final position they are to occupy in the completed object and in such position forming apertures in portions of said elements between the points at which the elements are forced to the final position stated.

49. In the manufacture of articles composed of metallic strips having a plurality of shapes, the improvement which consists in assembling such strips in the approximate relative positions they are to occupy in the finished object, in moving the assembled strips from the point of assembly to another point, in forcing the assembled strips from the approximate into the final positions they are to occupy in the finished object, and in operating upon said strips to secure them together when so forced.

50. In a machine of the character described, supports furnishing a guide-way for a horizontal plate and two vertical plates adjacent to the edges of the horizontal plate, devices for clamping angle irons into the corners at the junctions between the horizontal and vertical plates, and means for forming rivet holes extending thru the angle irons and the plates with which they are in contact.

51. In a machine of the character described, the combination of means for loosely supporting elements to be secured together to form a fabricated object, means for moving such elements longitudinally on their supports, abutments between which the elements pass when so moved, and means operative to force certain of said elements against said abutments in predetermined relationship to each other and clamp them at such position.

52. In a machine of the character described, means for loosely supporting elements to be secured together to form a fabricated object, means for collectively moving such elements longitudinally, abutments between which such elements are moved, means for forcing said elements vertically against each other and certain of the elements transversely against said abutments so as to clamp them in predetermined relationship to each other, and means for forming rivet holes in said elements while so clamped.

53. In a machine of the character set forth, a frame arranged to support a roughly assembled group of angles and plates, abutments on opposite sides of said group, spreading and clamping devices operating above and below said parts and acting to force them into contact with each other and certain of them laterally against said abutments, and means for forming rivet holes each extending thru a plurality of said parts while said parts are so held.

54. In a machine providing a central horizontal plane at which work is to be held, drilling devices located on opposite sides of the work and at predetermined distances above and below said horizontal plane, supporting and clamping devices for holding the work to be drilled, and means for adjusting the vertical position of the supporting and clamping devices to accommodate work of different thicknesses so that the central horizontal plane of the work will co-incide with the central horizontal plane of the machine.

55. In a machine having a central horizontal plane, drills located on opposite sides of the machine and disposed in groups at predetermined distances above and below said plane, clamping devices arranged to automatically bring loosely assembled elements of varying thicknesses to and hold them at a predetermined relationship to each other, and a vertical adjustment for said clamping devices.

56. In a machine having a central plane, drills located on opposite sides of the machine and disposed in groups at predetermined distances above and below said plane, work supporting means, a vertical adjustment for the work supporting means, and automatically operating clamping means for bringing the work to and holding it at a desired position while being operated upon by said drills.

57. In a machine having a central plane, drills located on opposite sides of said plane and at predetermined distances therefrom, adjustable work-clamping devices also located on opposite sides of said plane and serving to bring the central plane of the work to co-incidence with the central plane of the machine and hold it there, and means for advancing the drills upon the work while so held.

58. In a machine arranged to operate on work consisting of a central horizontal body and vertical plates on opposite sides of said body, clamping devices arranged to grasp and support the central body at a desired elevation, guides outside of the vertical plates, and adjustable supporting devices located under the edges of said vertical plates.

59. In a machine having a central horizontal plane and a central vertical plane, drills located on opposite sides of the horizontal plane and at predetermined distances above and below said plane, other drills located on opposite sides of the vertical plane and at predetermined distances therefrom, means for moving work of varying dimensions thru the machine and in proximity to said drills, and automatic clamping devices arranged to operate vertically and horizontally upon the work to bring its central vertical and horizontal planes to co-incidence with the central vertical and horizontal planes of the machine.

60. In a machine having an axis determined by the intersection of vertical and horizontal planes, drills located on opposite sides of one of said planes and movable parallel thereto, means for moving work of varying dimensions thru the machine in a line approximating the axis thereof, said work having an axis of its own determined by the intersection of perpendicular planes passing therethru, adjustable clamping devices arranged to operate automatically to bring the axes of work of different dimensions to co-incidence with the axis of the machine and hold them there, and means for advancing the drills upon work while so held.

61. In a machine for forming holes in work of an H-shape, a toggle having members acting into interior corners of said H, connections for said toggle to operate it so as to center and clamp work in said machine, and means for operating on said H while so clamped.

62. In a machine for operating upon a column of an H-shape, toggle joints located on opposite sides of the column and having the outer ends of the links of said toggles operating into the interior corners of said H, and connections at the centers of the toggles for applying pressure to clamp said H between the ends of opposing links.

63. In a machine for operating upon a column of an H-shape, toggle joints located on opposite sides of the column and having the outer ends of the links of said toggle operating into the interior corners of said H, connections at the centers of the toggles for applying pressure to clamp said H between the ends of opposing links, a gang of drills arranged to operate on said H while clamped by said toggles, and means for causing said drills to operate successively at different parts of said column.

64. In a machine for operating upon a column of an H-shape, clamping devices operating into the interior corners of said H to center said column in said machine, a gang of drills for operating on said column while clamped, and means for causing said drills to operate successively at different parts of said column.

VERNON B. TREVELLYAN.
WALLACE W. SMITH.